Figure 1:
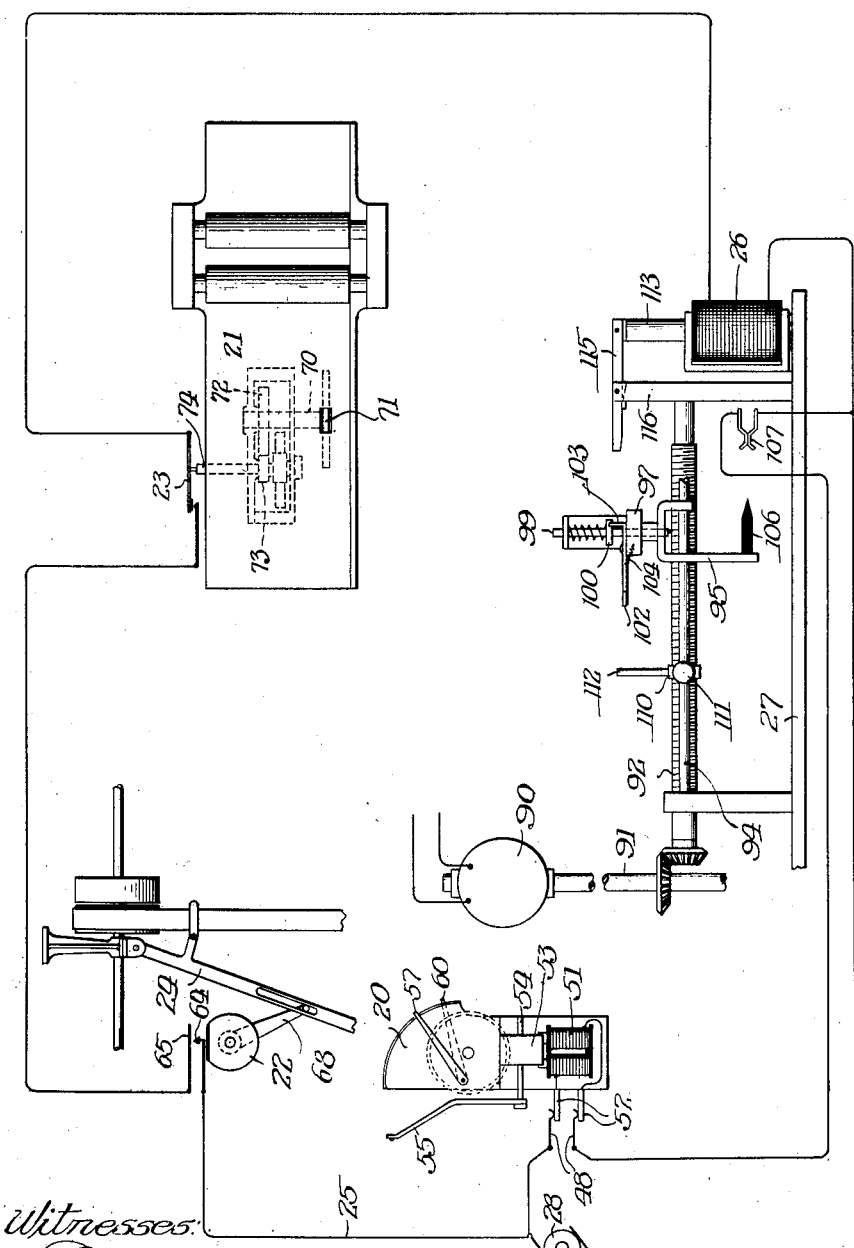

A. C. JOHNSON.
CONTROLLING MEANS FOR MACHINE RECORDERS.
APPLICATION FILED FEB. 12, 1913.

1,082,083.

Patented Dec. 23, 1913.
5 SHEETS—SHEET 1.

A. C. JOHNSON.
CONTROLLING MEANS FOR MACHINE RECORDERS.
APPLICATION FILED FEB. 12, 1913.

1,082,083.

Patented Dec. 23, 1913.

5 SHEETS—SHEET 2.

A. C. JOHNSON.
CONTROLLING MEANS FOR MACHINE RECORDERS.
APPLICATION FILED FEB. 12, 1913.

1,082,083.

Patented Dec. 23, 1913.
5 SHEETS—SHEET 3.

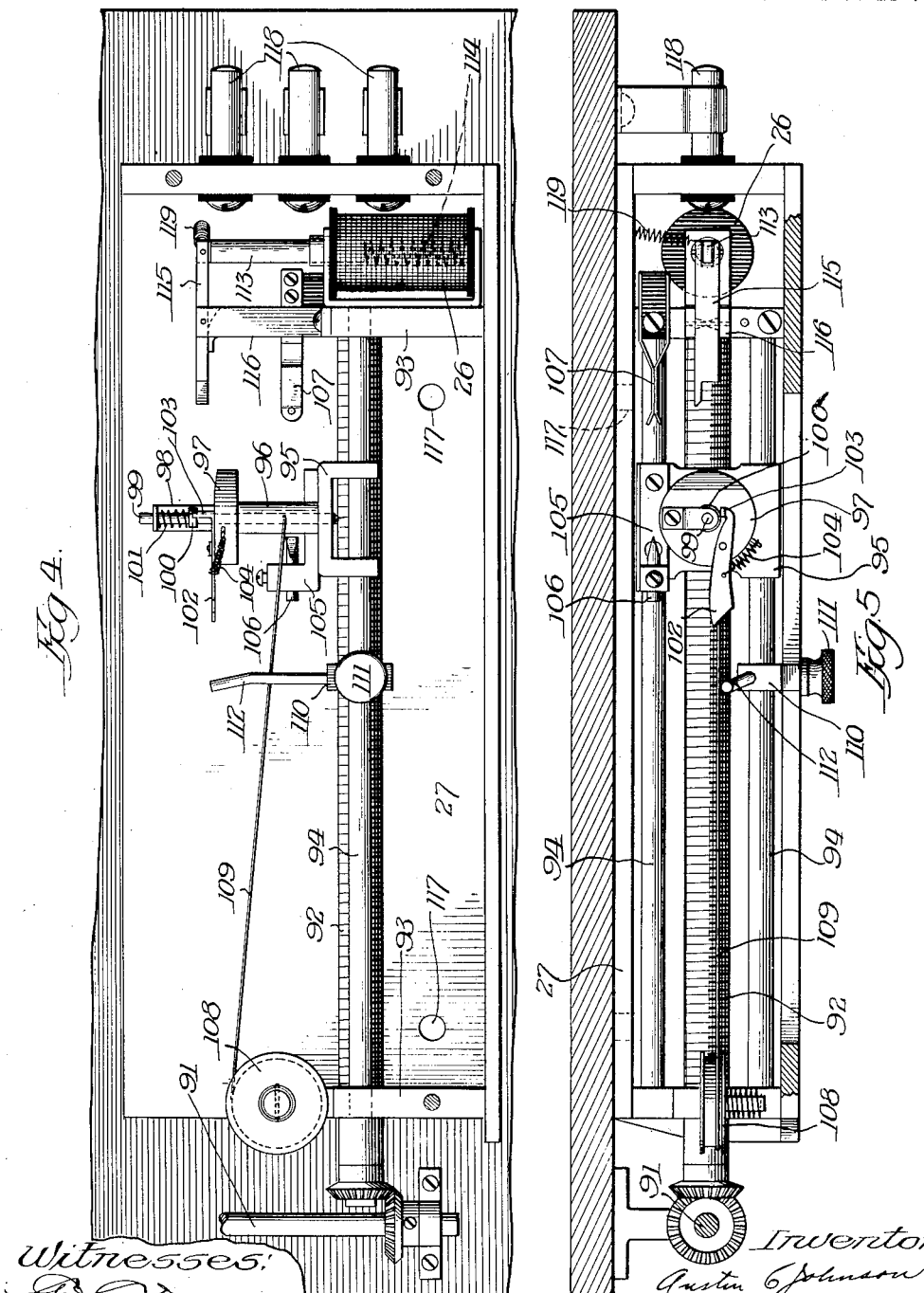

A. C. JOHNSON.
CONTROLLING MEANS FOR MACHINE RECORDERS.
APPLICATION FILED FEB. 12, 1913.
1,082,083.
Patented Dec. 23, 1913.
5 SHEETS—SHEET 5.
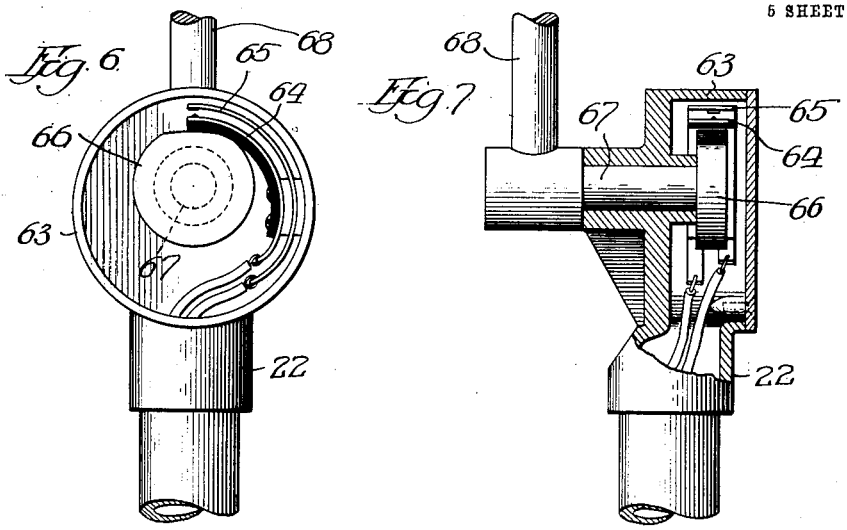
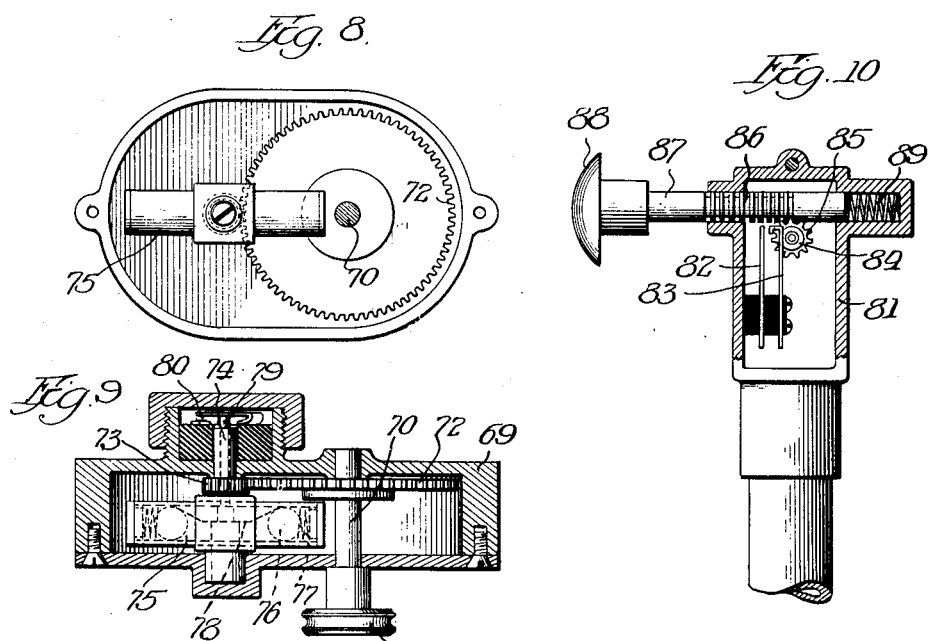

UNITED STATES PATENT OFFICE.

AUSTIN C. JOHNSON, OF CHICAGO, ILLINOIS, ASSIGNOR, BY MESNE ASSIGNMENTS, TO AUTOMATIC PRODUCTION METER COMPANY, OF CHICAGO, ILLINOIS, A CORPORATION OF MAINE.

CONTROLLING MEANS FOR MACHINE-RECORDERS.

1,082,083.  Specification of Letters Patent.  Patented Dec. 23, 1913.

Application filed February 12, 1913. Serial No. 747,851.

*To all whom it may concern:*

Be it known that I, AUSTIN C. JOHNSON, a citizen of the United States, and resident of Chicago, county of Cook, and State of Illinois, have invented certain new and useful Improvements in Controlling Means for Machine-Recorders, of which the following is a specification.

My invention relates to automatic time recorders and has particular reference to novel mechanical and electrical means for controlling the same.

This invention is shown as applied to a machine recorder similar to that shown in my co-pending application, Serial No. 719,937, filed Sept. 12, 1912.

In the operation of automatic recording means for registering the exact operative production of machines controlled by an operator, certain difficulties have been encountered in the control of the work recording element. It is particularly desirable that means should be included whereby the time required for performing a certain operation may be fixed by the employer and any time used in completing such operation over and above the time fixed by the employer should be indicated on the machine as idle time. For instance, mechanism should be employed whereby if an operator takes two minutes to complete an operation which should be completed in one minute, the recording instrument should show an operative period of one minute and an idle period of a minute. In the application referred to it was indicated that two switches must of necessity be actuated before a connection was completed through the recording devices; that is, a switch on the belt shifter and a switch operable by the work passing through the machine. However, with such a construction as just described, a workman might habitually take a much longer time for the completion of a piece of work than a fellow workman. Nevertheless, his working time for the day would be as great if not greater than if he completed a greater number of operations.

By the employment of mechanism such as shown herein on semi-automatic machines, where the human element enters largely into the extent of productivity and where a large number of workmen are employed in the production of similar articles on duplicate machines, after tests a proper time limit is set within which a complete operation should be completed. When this period of time is determined, the timing switch of my device is set for that length of time and the recording machine unit connected directly thereto. The operating shaft for the time switch is constantly rotated at a uniform speed. The circuit breaker which shall interrupt the action of the time recording machine is advanced by a constantly moving worm and when the period of time previously fixed as proper for the completion of an operation has lapsed, the circuit will be broken and the recording device will show the machine idle notwithstanding the fact that the machine may still be in operation. For the slow worker therefore, the period of inactivity between working periods will be increased whereas for the fast worker who may complete an operation before the time fixed as proper for such operation, the periods of inactivity will be lessened.

The invention broadly stated may be said to consist of a time recording element in circuit with a timing device whereby periods of activity and inactivity are shown by the making and breaking of a circuit and said timing device being in circuit with a shop machine and having means associated therewith whereby a pre-determined period required for the completion of an operation is fixed and the circuit broken through the recording element at the expiration of said period irrespective of the condition of activity or inactivity of the machine.

Figure 2:
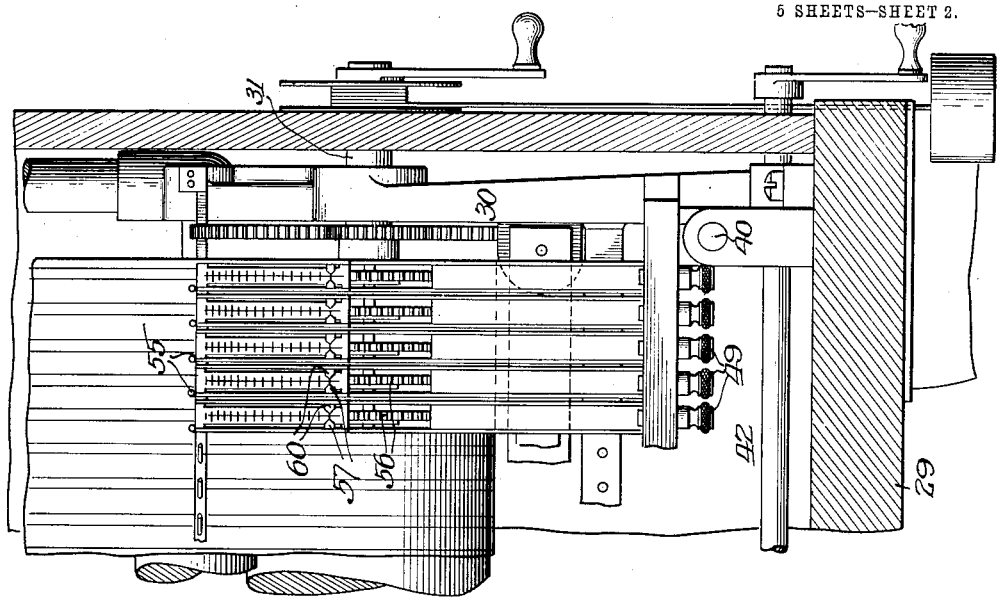
Figure 2:
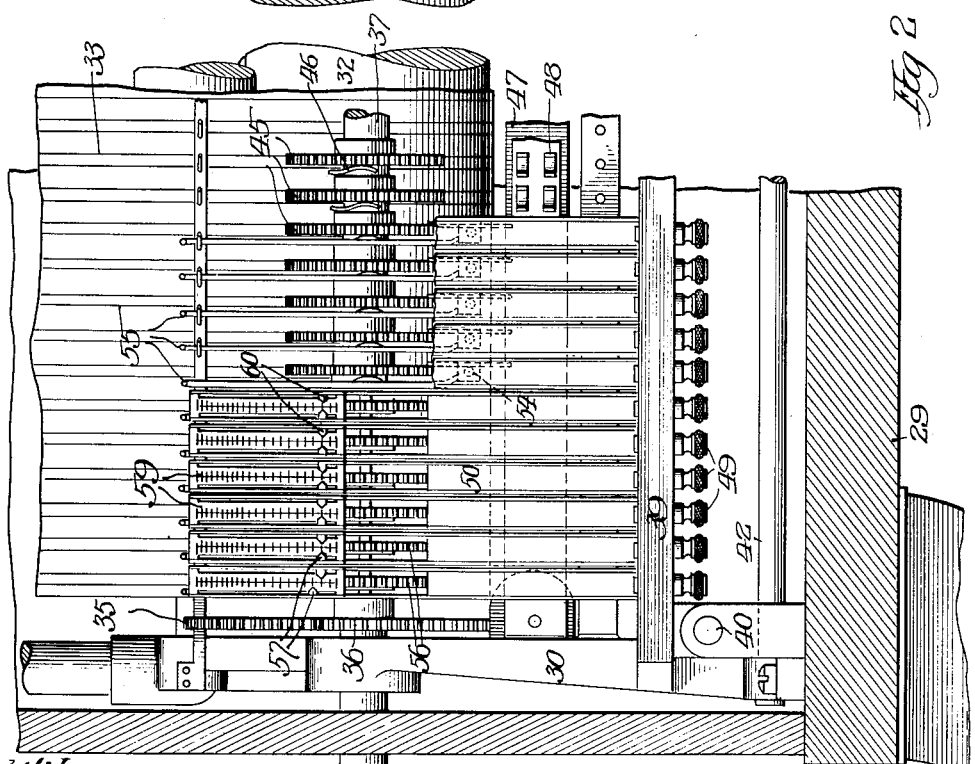
Figure 3:
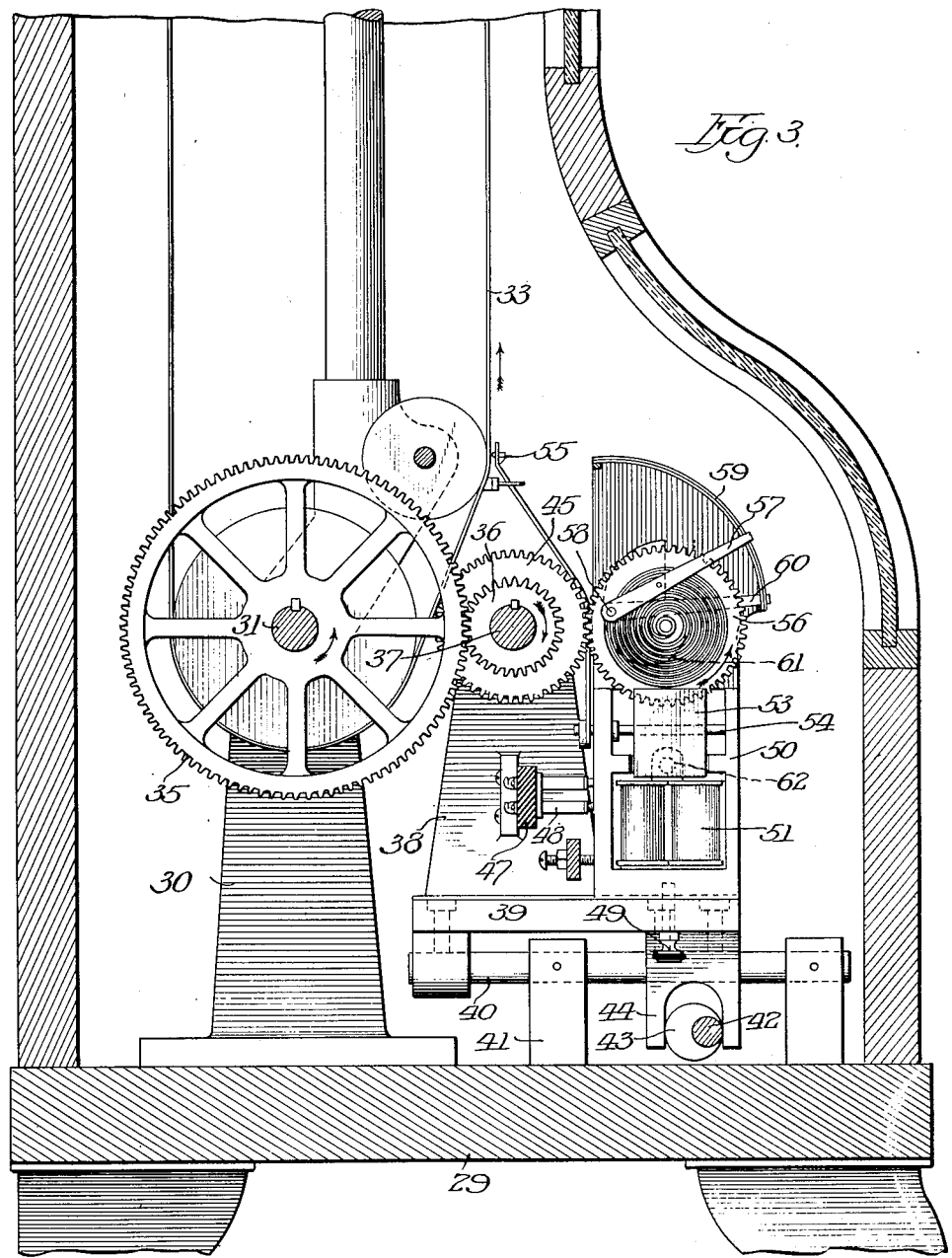

My invention will be more readily understood by reference to the accompanying drawings, wherein, Figure 1 is a diagrammatic view showing my novel controlling means, a time recording unit and the various switches necessary for the carrying out of the invention; Fig. 2 is a front elevation, partly in section, of a recording machine in which the recording units are placed; Fig. 3 is a vertical section through the machine shown in Fig. 2, showing the recording unit in detail; Fig. 4 is a plan view of a time switch which may be used; Fig. 5 is a side view of the device shown in Fig. 4; Fig. 6 is a face view of a belt shifter switch; Fig. 7 is a side view of the same with the casing broken away;

Fig. 8 is a face view of a centrifugal switch; Fig. 9 is a transverse section through the construction shown in Fig. 8, and, Fig. 10 is a detail elevation, partly in section, of another form of switch which may be used instead of that shown in Figs. 8 and 9.

Referring to the drawings and more particularly to Fig. 1, which is a diagrammatic view of an arrangement such as contemplated by me, it will be seen that I provide a recording unit 20, by means of which the operative and idle time of a shop machine 21, may be recorded. The recording unit and the shop machine are connected electrically, there being two switches 22, 23, interposed in the circuit. The former switch is adapted to be actuated manually by the belt shifter 24, whereby the switch is closed when the power for operating the machine 21 is applied. The switch 23 is operated by the work passing through the machine.

In the preferable construction as applied to a planer such as shown, the switch is actuated by centrifugal force and the circuit is not closed unless work is actually moving through the machine. The circuit 25, which is completed by the closing of the switches 22, 23, passes through a solenoid 26, forming a part of a timing device 27. A motor 28, or other source of electrical energy is interposed in the circuit. It will be seen by the diagrammatic illustration of the arrangement that even though both switches are closed in proper manner, that the recording unit 20 will not be actuated, this unit being in circuit with the timing device 27 and operable thereby. Thus it will be seen that the actuation of the recording device is brought about by the timing device and that the timing device is in turn controlled to a certain extent by the solenoid 26, which is excited by the current passing through the closed switches 22, 23.

I will describe the different elements indicated in the diagrammatic view by the numerals 20, 22, 23 and 27 in detail in order that their operation may be understood.

*The recording device.*—A device which is suitable for the purpose indicated and a duplicate of which is here illustrated, is shown in my co-pending application Serial No. 719,937, filed Sept. 12, 1912, above referred to. Inasmuch as the details of such construction form no part of the present invention, I will not describe them specifically. Such a machine includes a base 29, having upwardly projecting brackets 30, in which is maintained a transverse shaft 31, carrying a drum 32. This drum and a similar drum at the top of the machine, not shown, provide a support for a chart 33. This chart is given constant travel by means of suitable clock mechanism 34, motion being first imparted to the lower drum 32. Also secured to the transverse shaft 31, is a gear 35, normally meshing with a pinion 36, carried by a shaft 37, which shaft is mounted in the brackets 38, supported by a table 39, which table or platform is adapted for bodily sliding movement on the shafts 40, supported above the base 29, of the machine on apertured standards 41. The movement of the table 39 is imparted thereto by means of a shaft 42, carrying cams 43, said cams engaging the bifurcated downward projection 44, secured to the table 39. The shaft 37, which is supported in the brackets 38, also has mounted thereon gear wheels 45, spaced apart by suitable collars and frictionally engaging each other and the shaft by means of suitable springs 46. Thus the gears 45 normally rotate with the shaft 37, being frictionally held thereon. A cross member 47, extends between the brackets 38, and carries a plurality of pairs of electrical contacts 48, said contacts being shown in Figs. 1 and 3. The recording units, of which there may be any desired number, are removably mounted on the base 39, being held in place by thumb-screws 49. These units being in duplicate, but one thereof will be described. The frame 50, of a unit, carries a pair of magnets 51, having electrical connections which terminate in contacts 52, coöperating with the contacts 48 heretofore described. An armature 53, is secured to and oscillates with a short shaft 54, having a bearing in the frame 50, this shaft also having secured thereto a marking finger 55, which finger carries at its point a pen or pencil and contacts the moving sheet 33. The mechanism just described marks the sheet in such manner as to indicate the active and idle time of the shop machine to which it is connected. The total of such times might be determined from the sheet itself, but this would be a laborious process. I have therefore combined with the unit an accumulating mechanism comprising a gear 56, meshing with the gear 45, on the shaft 37. This gear carries on one face a helical groove with which a pin or an indicator 57 coöperates. The indicator 57 is pivoted at 58, to a portion of the casing or frame 50 of the unit. It will be seen that as the gear rotates in the direction of the arrow, the indicator will gradually be moved toward the periphery of the gear and by such arrangement hours are indicated on the arc-shaped dial 59, of the unit. In order to indicate minutes on the dial 59, I provide an indicator 60, pivoted coincident with the indicator 57, and actuated by a cam 61, frictionally held on the shaft which carries the gear 56. A pin on the indicator 60 coöperates with the periphery of the cam 61, the indicator being thus moved throughout its limit of movement at each revolution of the gear 56. The armature 53, which is moved by the passage of current through the magnets 51, and which in turn causes the movement of the marker 55, coöperates with one face of the gear wheel 56, the arrangement being such that when no current is passing through the magnets, the armature is pressed against the face of the gear by means of a suitable spring 62, thus preventing the rotation of the gear. However, as the shaft 37 is constantly rotated, it will be seen that the gear 45 must slip on the shaft, this being provided for by the frictional connection between the gear and the shaft. However, as the current is passed through the magnets 51, the operation of the parts continues. It is believed that with this description, the operation of the recording device will be understood.

*The belt shifter switch.*—This switch, indicated diagrammatically as 22, is shown in detail in Figs. 6 and 7, and comprises a casing 63, within which are mounted two contacts 64, 65. A cam 66 is carried on the end of a short shaft 67, and is rotated by means of an arm 68, suitably connected to the belt shifter lever. It will be seen that when the belt is shifted, the high part of the cam will cause the contacts 64, 65, to be brought into engagement and the circuit closed.

*The shop machine switch.*—This switch, as indicated at 23, in Fig. 1, is actuated centrifugally by the passage of work through the machine, the application being shown to a planer. As specifically described, the switch as shown in Figs. 8 and 9, comprises a casing 69, within which is mounted a transverse shaft 70, carrying on its outer end a wheel 71, which may be toothed or in some similar manner engage the work as its passes through the machine. A gear 72, is connected to the shaft 70, and meshes with a small pinion 73, on a hollow shaft 74. Secured to the shaft 74 is a tubular member 75, carrying therein balls 76, normally pressed toward the axial center by springs 77. These balls engage a cam 78, which cam is connected to a stem 79 extending through the hollow shaft 74, and separating the contacts 80. The movable member of the contact 80 is a spring which normally tends to force the stem 79 inwardly. It will be seen that as the tubular member is rapidly rotated, the centrifugal force will tend to throw the balls 76 outwardly and thereby permit the inward movement of the cam 78 and stem 79 and allow the making of the contact 80.

The construction shown in Fig. 10, may be employed on a shop machine in case the machine is not adapted to use the switch shown in Fig. 8; that is, on some machines the work is merely inserted against a permanent stop, certain operations being performed and the work removed. In such case a switch such as shown in Fig. 10 may be employed. In this construction there is provided a casing 81 within which suitably insulated are contacts 82, 83, the latter being a spring member normally remaining out of contact with the part 82. Bearing against the contact 83 is a cam 84, connected to a pinion 85, which pinion is in mesh with the threaded stem 86 of the member 87, having a contact piece 88, on one end thereof. The member 87 is normally held in the position shown in the drawings by means of a coiled spring 89. Assuming that the contact piece 88 is placed in the path of the work inserted in the machine, the member 87 will be retracted causing rotation of the pinion 84, and the joining of the contacts 82, 83, by reason of the higher part of the cam 84. It will be seen that but very slight movement is necessary to cause the closing of the circuit and that irrespective of the increased movement, the degree of pressure will be the same.

*The timing device.*—Referring now to the timing device 27, shown in Figs. 1, 4 and 5, it is assumed that a motor 90, or other prime mover is employed whereby a line shaft 91, may be constantly rotated at a uniform speed. By means of beveled gears, a suitably threaded shaft 92 is connected to the line shaft 91, this threaded shaft likewise rotating constantly at a uniform speed. The ends of the shaft 92 have bearings in the supports 93, which supports also carry fixed shafts 94 extending parallel with the threaded shaft and carry the actuating member which consists of a frame 95, suitably apertured to accommodate the fixed shafts, to which frame is connected a tubular part 96, having an enlargement 97, on the outer end thereof. A bracket 98 is extended from the face of the enlargement 97, and provides in an apertured right-angled portion, a bearing for the outer end of a reciprocatory shaft 99, carrying a collar 100, a spring 101 extending between the collar and the right-angled portion, whereby the shaft 99 is normally forced inwardly, said shaft extending through the tubular portion 96, and having a point engaging the threaded shaft 92. Pivoted to the enlargement 97 is a tripping lever 102, having a right-angled lug 103, which lug is adapted to be seated behind the collar 100, when the shaft 99 is retracted. The lever 102 is held in proper relation by means of a spring 104. Carried by a bracket 105, secured to the frame 95, is a member 106, constructed of fiber or non-conducting material and wedge-shaped at its point, this member being adapted to break a contact 107, best shown in Figs. 1 and 5. In order that the actuating member may be returned properly, I provide the spring drum 108, and cord 109, connected to the tubular member 96. In order to limit the return of the actuating member and to operate the tripping lever 102, I provide a combined stop and tripping arm which consists of an apertured member 110, slidably mounted on one of the shafts 94, and held in adjusted position by means of a thumb-nut 111. An arm 112 projects from the part 110, into the path of the tripping lever 102. Also forming part of the timing device is the solenoid 26, having a core 113, which core is normally held in the position shown in Fig. 4, by means of a coiled spring 114. Loosely pivoted to the outer end of the core 113, is a lever 115, which lever is also pivoted loosely to an arm 116, secured to a support 93. The lever 115, as shown in Fig. 5, has a pointed beveled end and is adapted to rest in front of the shoulder 100, on the shaft 99, when the actuating member has advanced to the proper point. It will be seen that upon the actuation of the solenoid the core will be drawn inward, the lever 115, swung on its pivot and the shaft 99 forced outwardly and its point disengaged from the threaded shaft 92. When in this position the lug 103 on the tripping lever 102 will drop behind the collar 100 and hold the shaft in retracted position. Upon the disengagement of the shaft 99, from the threaded shaft 92, the actuating member will be drawn backward by the force of the spring drum 108, until contact is had with the stop 110, and the lever 102 contacts the arm 112, whereupon the arm 102 is tripped permitting the spring 101 to force the shaft 99 inwardly with its point in engagement with the threads on the shaft 92.

It will be understood by the general description that a recording machine might be made up in any desired number of recording units, each thereof being connected to a shop machine. It likewise follows that for each recording unit there must be a timing device such as just described. These devices are constructed in the form of units and are adapted for ready insertion or removal, being held in place by suitable pins fitted in the openings 117, and by engagement of the spring contact points 118. The line shaft 91, it is understood, may actuate all of the units.

The operation of the timing device may be as follows: Assuming that the connections have been made as shown diagrammatically in Fig. 1, the employer determines in a desirable manner the proper time which shall be consumed by a workman in finishing a certain operation on a shop machine. The stop and tripping arm 110, 112, are then located in such position that with the threaded shaft 92 rotating, an equal time will be consumed in traveling from the stop to a point where the wedge-shaped member 106, will enter into and cause the separation of the contacts 107, whereupon the connection to the timing device will be broken and the shop machine will be shown idle. This occurs even though the machine may still be in productive operation. During this time the solenoid 26 will be actuated and the lever 115 held in a tilted position from that shown in Fig. 4. However, as soon as the operation on the shop machine is completed the circuit through the solenoid will be broken, and the spring 114 will return the arm 115 to the position shown in Fig. 4, and the collar 102, of the shaft 99, being in the plane movement of the end of the lever 115, the lever will shift laterally against the resistance of the coiled spring 119, and seat behind the collar 100. As soon as the circuit is again closed through the solenoid 26 by the beginning of productive operation in the shop machine, the solenoid will be actuated, the lever 115 moved, thus retracting the shaft 99, and allowing the actuating member to be returned to the point permitted by the stop 110, whereupon the operation is repeated. By this means it will be seen that should a workman be habitually requiring greater time for the completion of an operation than is thought to be necessary, the extra time required will not be credited to him but will show the machine idle. For the operator who may work faster than the time fixed as necessary to complete an operation, the timing device will properly compensate in this way; the operation may be completed and the connection through the solenoid broken before the actuating member reaches the point where the connection to the recording machine is broken. He will therefore, be credited with operative production during the time when he may be preparing another article for insertion in the shop machine. The result on the recording machine chart will be to show a less period of time between operations, the length of time for each operation being the same as for a man who works more slowly. Thus the timing device is equitable to both classes of workers.

To sum up the advantages of the invention as herein disclosed, it may be said that they consist in providing means for fixing the proper period of time required to complete a certain operation on a certain machine; then automatically registering the efforts of the workman on the shop machine to maintain his production equal to the standard set. Furthermore, in the present machine, there is no means known to the applicant by which a workman may so arrange his machine and the parts thereof, that the recording device will show the machine in operation when it is actually idle. Unless the shop machine is operated and the switch, indicating the insertion and removal of work actuated at proper intervals, the timing device and consequently the recording device will not operate at all and will show the shop machine to be idle.

It is obvious that the mechanisms herein shown are typical of many others which might be devised in order to secure a similar result. I do not therefore wish to be limited to the details of constructions herein shown and described.

For convenient use in the claims, I have used the term "efficient operation" as indicating the operation of the shop machine when it is actually doing the work for which it is intended. In its broadest phase, however, it will be seen that my invention consists of mechanism for automatically and intermittently setting other mechanism in operation, combined with a timing mechanism whereby the operation of said other mechanism will be terminated at the end of a predetermined period, if it has not been previously terminated by cessation of operation of the primary mechanism. In this sense the shop machine may be considered the primary mechanism and the recording device as the secondary mechanism.

I claim:

1. In controlling means of the class described, the combination of a recording device, a timing device electrically connected to the recording device, means on said timing device for setting up operating periods whereby said recording device shall be actuated at the beginning and after the expiration of an operating period, a switch associated with a shop machine, said switch being electrically connected to said timing device, the arrangement being such that the beginning of an operating period on said timing device is controlled by the operating of the switch on the shop machine, substantially as described.

2. In controlling means of the class described, the combination of a recording device, a timing device electrically connected to the recording device, means on said timing device for setting up operating periods whereby said recording device shall be actuated at the beginning and after the expiration of an operating period, a switch associated with a shop machine, said switch being electrically connected to said timing device, the beginning of an operating period being determined by the operation of the switch on the shop machine, the ending of the operating period being determined by mechanism on the timing device, substantially as described.

3. In controlling means for recording devices, the combination of a timing device in circuit with a recording device, said timing device acting as the recorder-actuating means, a switch operatively connected to a shop machine, said timing device being separately in circuit with said switch, means for setting up operating periods on said timing device, said recorder being actuated electrically at the beginning and end of an operating period, the beginning of such period being determined by the insertion of work into the shop machine and the actuation of the switch in circuit with said timing device, substantially as described.

4. In means of the class described, the combination of a recording device and a timing device for actuating the same, a constantly rotating member and an actuating member associated with said timing device and arranged whereby motion is imparted to said actuating member, substantially as described.

5. In means of the class described, the combination of a recording device and a timing device for actuating the same, a constantly rotating member and an actuating member associated with said timing device and arranged whereby motion is imparted to said actuating member, and means for tripping said actuating member, said tripping means being actuated by a shop machine, substantially as described.

6. In means of the class described, the combination of a recording device and a timing device for actuating the same said timing device including a constantly rotating worm, an actuating member adapted to be moved in one direction by said worm, means for limiting the travel of said actuating member, and means for tripping said actuating member, said means being operated by a shop machine, substantially as described.

7. In means of the class described, the combination of a recording device and a timing device for actuating the same, said devices being electrically connected, said timing device including a constantly rotating member and an actuating member moved thereby, the electrical connection between said recording device and said timing device being changed by said actuating member as it reaches the end of its travel, substantially as described.

8. In means of the class described, the combination of a recording device and a timing device for actuating the same, said devices being electrically connected, said timing device including a constantly rotating member and an actuating member moved thereby, the electrical connection between said recording device and said timing device being changed by said actuating member as it reaches the end of its travel, and electrical means for tripping said actuating member, substantially as described.

9. In means of the class described, the combination of a recording device and a timing device for actuating the same, said devices being electrically connected, said timing device including a constantly rotating member and an actuating member moved thereby, the electrical connection between said recording device and said timing device being changed by said actuating member as it reaches the end of its travel, said tripping means being controlled by a shop machine, substantially as described.

10. In a timing device, the combination of a constantly rotating member, an actuating member associated with said constantly rotating member and adapted to be moved thereby, means for tripping said actuating member at the end of its travel, and means for varying the extent of return travel of said member, substantially as described.

11. The combination with a shop machine, of an electric circuit, a recording device interposed in said circuit, a switch in said circuit arranged to be actuated by the efficient operation of the shop machine to close said circuit, means for holding said switch open while the shop machine is not in efficient operation, a timing device arranged to break said circuit at the end of a predetermined time period after said circuit has been closed and during the continued efficient operation of the shop machine, and means for moving said recording device to non-recording position whenever said circuit is broken.

12. The combination with a recording machine provided with a recording arm, of a shop machine, an electric circuit, a switch arranged to be closed by and during the efficient operation of the shop machine and to be open at all other times, means actuated by the closing of said circuit to move said arm to recording position, and a timing mechanism interposed in said circuit and operating to break said circuit during the continued efficient operation of the shop machine at the end of a predetermined time period beginning whenever said circuit is closed by the operation of said shop machine.

13. The combination with a shop machine, of an electric circuit, a recording device interposed in said circuit, and a switch for closing said circuit, said switch comprising a friction wheel adapted to be engaged by work passing through said shop machine, contact points connected with said circuit, and means actuated by the rotation of said friction wheel whereby said contact points are permitted to engage each other to close said circuit.

14. The combination with a shop machine, of an electric circuit, a recording device interposed in said circuit, and a switch for closing said circuit, said switch comprising a friction wheel arranged to engage work passing through said shop machine, a pair of contact points in said circuit, means tending to bring said contact points together, means tending to hold said contact points apart, and mechanism actuated by the rotation of said friction wheel to move said last-named means from its normal position so as to permit said contact points to be brought into electrical contact with each other.

15. The combination with a shop machine, of an electric circuit, a recording device interposed in said circuit, and a switch for closing said circuit, said switch comprising a friction wheel adapted to engage work passing through said shop machine, a pair of electrical contacts in said circuit, means tending to bring said contacts together, a shaft, gearing interposed between said shaft and the shaft of said friction wheel, a pin longitudinally slidable in said shaft, a hollow member secured to said shaft, cams in operative engagement with said pin, a pair of balls arranged in said hollow member in engagement with said cams, and springs arranged to hold said balls in contact with said cams so as to normally hold said pin in position to hold said contact points apart, all so arranged that the rotation of said friction wheel will drive said shaft and cause said balls to move by centrifugal force against said springs and into such position with relation to said cams as to permit said pin to move away from said contact points, thereby permitting said contact points to come into electrical engagement with each other.

AUSTIN C. JOHNSON.

Witnesses:
CHAS. F. MURRAY,
T. D. BUTLER.

Correction in Letters Patent No. 1,082,083.

It is hereby certified that in Letters Patent No. 1,082,083, granted December 23, 1913, upon the application of Austin C. Johnson of Chicago, Illinois, for an improvement in "Controlling Means for Machine-Recorders," an error appears in the printed specification requiring correction as follows: Page 2, line 114, for the word "or" read *on;* and that the said Letters Patent should be read with this correction therein that the same may conform to the record of the case in the Patent Office.

Signed and sealed this 10th day of February, A. D., 1914.

[SEAL.]

J. T. NEWTON,

*Acting Commissioner of Patents.*